US012812492B2

(12) United States Patent
Smith et al.

(10) Patent No.: US 12,812,492 B2
(45) Date of Patent: Nov. 24, 2026

(54) MAKE-BEFORE-BREAK ROAMING (MBBR) MODE SELECTION FOR A STREAM CLASSIFICATION SERVICE (SCS) FLOW

(71) Applicant: Cisco Technology, Inc., San Jose, CA (US)

(72) Inventors: Malcolm M. Smith, Richardson, TX (US); Binita Gupta, San Diego, CA (US); Brian D. Hart, Sunnyvale, CA (US); Indermeet S. Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 18/786,363

(22) Filed: Jul. 26, 2024

(65) Prior Publication Data

US 2025/0220538 A1 Jul. 3, 2025

Related U.S. Application Data

(60) Provisional application No. 63/616,556, filed on Dec. 30, 2023.

(51) Int. Cl.
*H04W 36/18* (2009.01)
*H04L 43/028* (2022.01)
*H04W 28/02* (2009.01)

(52) U.S. Cl.
CPC ......... *H04W 36/185* (2023.05); *H04L 43/028* (2013.01); *H04W 28/0268* (2013.01)

(58) Field of Classification Search
CPC ............... H04L 43/028; H04L 25/0254; H04L 25/03165; H04L 2012/5686; H04L 2025/03464; H04L 41/145; H04L 41/16; H04L 45/08; H04W 28/0268; H04W 36/0005; H04W 36/0007; H04W 36/0009; H04W 36/0011; H04W 36/0016; H04W 36/0019; H04W 36/0022; H04W 36/00222; H04W 36/00224; H04W 36/0024; H04W 36/00226; H04W 36/0069; H04W 36/00692; H04W 36/00695;

(Continued)

(56) References Cited

U.S. PATENT DOCUMENTS 12,207,124 B2 * 1/2025 Ajami ............... H04W 28/0221
12,395,954 B2 * 8/2025 Monajemi ......... H04W 56/0025

(Continued)

OTHER PUBLICATIONS

Ashley, Stream Classification Service, IEEE 802.11-09/0725r0, 24 pages, Jul. 2009.*

(Continued)

*Primary Examiner* — Frank Duong
(74) *Attorney, Agent, or Firm* — Merchant & Gould P.C.

(57) ABSTRACT

Make-Before-Break Roaming (MBBR) mode selection for a Stream Classification Service (SCS) flow may be provided. An Access Point (AP) may receive SCS request from a station for a SCS flow. The SCS request may include MBBR requisites for the SCS flow. The AP may determine a MBBR mode for the SCS flow based on the MBBR requisites and a MBBR mode policy. The AP may configure the determined MBBR mode for the SCS flow. The AP may send a SCS response for the SCS request to the station. The SCS response may include the determined MBBR mode for the SCS flow.

20 Claims, 5 Drawing Sheets

(58) Field of Classification Search

CPC ........... H04W 36/00698; H04W 36/03; H04W 36/08; H04W 36/0083; H04W 36/00835; H04W 36/00837; H04W 36/0085; H04W 36/0088; H04W 36/0094; H04W 36/18; H04W 36/185; H04W 36/28; H04W 16/22; G06N 3/02; G06N 3/042; G06N 3/044; G06N 3/0442; G06N 3/045; G06N 3/0455; G06N 3/0464; G06N 3/0499; G06N 3/08; G06N 3/088; G06N 3/09; G06N 3/091; G06N 3/092; G06N 20/00; G06N 20/10; H04B 17/3912; H04B 17/3913

See application file for complete search history.

(56) References Cited

U.S. PATENT DOCUMENTS 12,550,080 B2 * 2/2026 Monajemi ............. H04W 16/24
12,615,543 B2 * 4/2026 Canpolat ........... H04W 28/0268
2009/0154425 A1 6/2009 Patil et al.
2016/0037389 A1 2/2016 Tagg et al.
2020/0288332 A1 9/2020 Annambhotla
2022/0393988 A1 12/2022 Erta et al.
2023/0058871 A1 * 2/2023 Xin ................... H04W 52/0258
2023/0362772 A1 11/2023 Ahmad et al.
2024/0196452 A1 6/2024 Sternberg et al.
2024/0298247 A1 * 9/2024 Huang .................. H04W 48/02
2025/0071602 A1 2/2025 Viger et al.
2025/0080469 A1 * 3/2025 Smith ................. H04L 47/2441
2025/0113370 A1 * 4/2025 Shafin .................. H04L 67/104
2025/0227537 A1 * 7/2025 Huang ................ H04L 47/2441
2025/0392549 A1 * 12/2025 Smith ..................... H04L 45/24

OTHER PUBLICATIONS

Orr et al., Seamless Roaming within a Mobility Domain, IEEE 802.11-23/2157r2, 26 pages, Nov. 2023.*
International Search Report and Written Opinion for International Application No. PCT/US2024/062337, mailed Apr. 22, 2025, 16 Pages.

* cited by examiner

300

MAKE-BEFORE-BREAK ROAMING (MBBR) MODE SELECTION FOR A STREAM CLASSIFICATION SERVICE (SCS) FLOW

RELATED APPLICATION

Under provisions of 35 U.S.C. § 119 (e), Applicant claims the benefit of U.S. Provisional Application No. 63/616,556, filed Dec. 30, 2023, which is incorporated herein by reference.

TECHNICAL FIELD

The present disclosure relates generally to Make-Before-Break Roaming (MBBR) mode selection for a Stream Classification Service (SCS) flow.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various implementations of the present disclosure. In the drawings.

DETAILED DESCRIPTION

Overview

Figure 1:
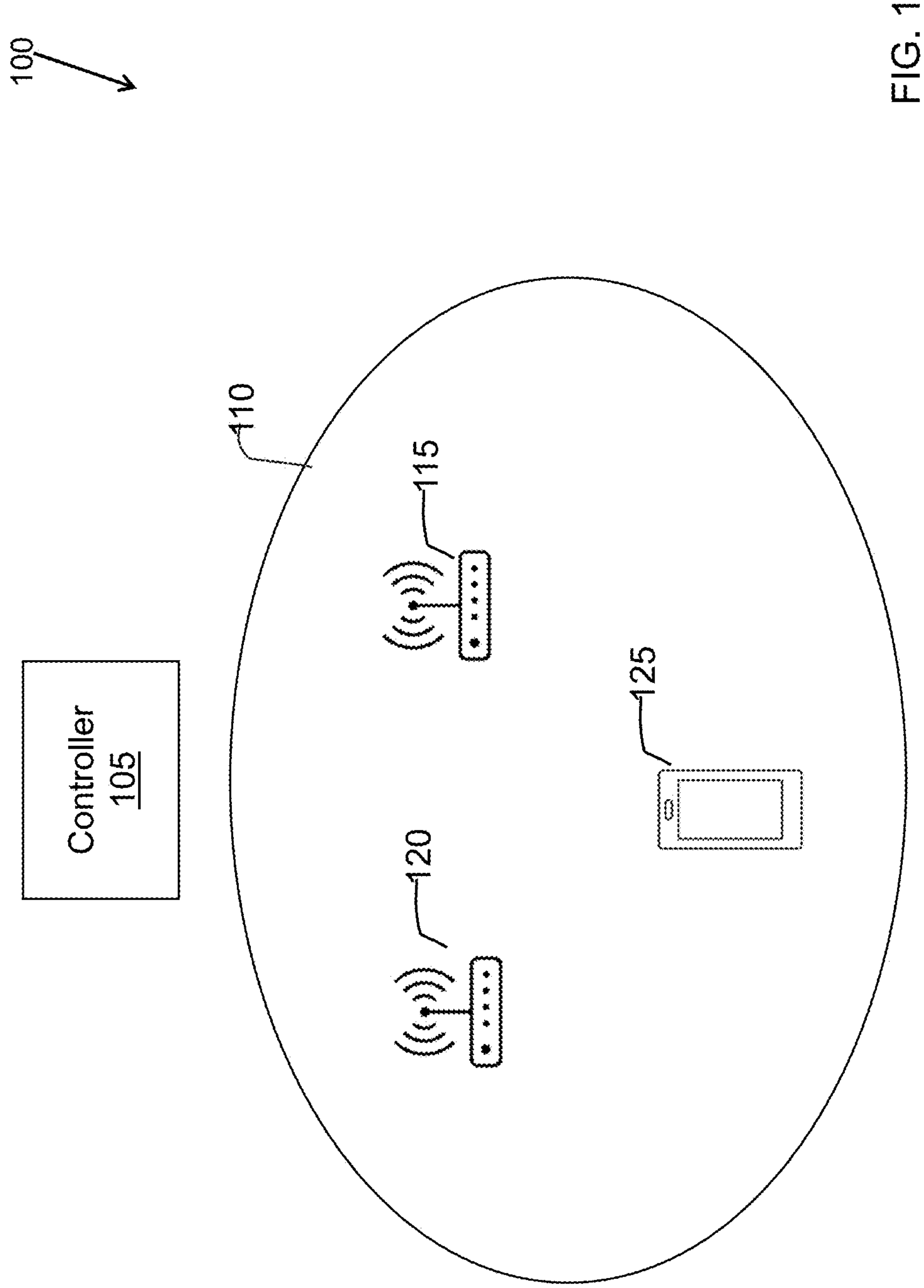
FIG. 1 is a block diagram of an operating environment for Make-Before-Break Roaming (MBBR) mode selection for a Stream Classification Service (SCS) flow.

Make-Before-Break Roaming (MBBR) mode selection for a Stream Classification Service (SCS) flow based on SCS negotiated application roaming requisites may be provided. An Access Point (AP) may receive a SCS request from a station for a SCS flow. The SCS request may include MBBR requisites for the SCS flow. The AP may determine a MBBR mode for the SCS flow based on the MBBR requisites and a MBBR mode policy. The AP may configure the determined MBBR mode for the SCS flow. The AP may send a SCS response for the SCS request to the station. The SCS response may include the determined MBBR mode for the SCS flow.

MBBR mode selection for a SCS flow based on flow features may be provided. An AP may receive a SCS request for a SCS flow from an application from a station. The AP may determine flow features from the SCS flow. The AP may determine a matching application profile from a plurality of application profiles matching with the application based on the flow features. Each of the plurality of application profiles are associated with a MBBR mode. The AP may determine the MBBR mode associated with the matching application profile as the MBBR mode for the SCS flow.

MBBR mode selection based on SCS application's profiles using a machine learning model may be provided. An AP may receive a SCS request for a SCS flow from an application from a station. The AP may determine flow features for the SCS flow. The AP may determine a MBBR mode for the SCS flow based on the flow features using a machine learning model. The machine learning model is trained to: receive the flow features as an input, and determine the MBBR mode for the SCS flow based on the flow features.

Both the foregoing overview and the following example implementations are examples and explanatory only and should not be considered to restrict the disclosure's scope, as described and claimed. Furthermore, features and/or variations may be provided in addition to those described. For example, implementations of the disclosure may be directed to various feature combinations and sub-combinations described in the example implementations.

Example Implementations

The following detailed description refers to the accompanying drawings. Wherever possible, the same reference numbers are used in the drawings and the following description to refer to the same or similar elements. While implementations of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In Wireless Fidelity (Wi-Fi) networks, Make-Before-Break Roaming (MBBR) may allow seamless transition for a Station (STA) between Access Points (APs) by adding a target AP before removing a serving AP. Different MBBR modes may exist regarding where Media Access Control (MAC) functionality may be split between the infrastructure (that is, the serving and target APs) and the STA. The MAC functionalities may include MAC Protocol Data Unit (MPDU) recovery after roaming from the serving AP to a target AP. Some MBBR modes may maintain more state at the infrastructure to reduce STA's complexity at the cost of tighter AP coordination. Other MBBR modes may push complexity to the STA for looser AP coupling but may require STA awareness of MBBR modes. In addition, each MBBR mode or functional split may have unique characteristics, such as, a degree of MAC Service Data Unit (MSDU) loss or packet loss, buffering requirements, etc. during the roaming process.

Selecting a MBBR mode at a time of network deployment or provisioning may not account for dynamic network conditions and application needs. Some applications may require seamless roaming (that is, zero packet loss) while others may be tolerant to disruption. The disclosure provides processes for MBBR mode selection to accommodate these differences in application requirements.

In accordance with example implementations, the MBBR mode that may determine the MAC functionality split for roaming may be selected or determined based on roaming requisites of an application. As discussed in greater detail in the following sections of the disclosure, application roaming requisites may include roaming or handoff latency, reliability, STA capabilities, connection requisites, etc.

FIG. 1 shows an operating environment 100 for MBBR mode selection for a Stream Classification Service (SCS) flow. As shown in FIG. 1, operating environment 100 may comprise a controller 105 and a coverage environment 110. Coverage environment 110 may comprise, but is not limited to, a Wireless Local Area Network (WLAN) comprising a plurality of APs that may provide wireless network access (e.g., access to the WLAN for client devices). The plurality of APs may include a first AP 115 and a second AP 120. The plurality of APs may provide wireless network access to a STA 125 as it moves within coverage environment 110.

STA 125 may comprise, but are not limited to, a smart phone, a Head Mounted Device (HMD), a mice, a keyboard, a personal computer, a tablet device, a mobile device, a telephone, a remote control device, a set-top box, a digital video recorder, an Internet-of-Things (IoT) device, a network computer, a router, Augmented Reality (AR)/Virtual Reality (VR)/XR devices, or other similar microcomputer-based device. Each of the plurality of APs may be compatible with specification standards such as, but not limited to, the Institute of Electrical and Electronics Engineers (IEEE) 802.11 specification standard for example.

In some implementations, the plurality of APs and STA 125 may use Multi-Link Operation (MLO) where they simultaneously transmit and receive across different bands and channels by establishing two or more links to two or more AP radios. These bands may comprise, but are not limited the 2 GHz band, the 5 GHZ band, the 6 GHz band, and the 60 GHz band.

Controller 105 may comprise a Wireless Local Area Network Controller (WLC) and may provision and control coverage environment 110 (e.g., a WLAN). Controller 105 may allow STA 125 to join coverage environment 110. In some implementations, controller 105 may be implemented by a Digital Network Architecture Center (DNAC) controller (i.e., a Software-Defined Network (SDN) controller) that may configure information for coverage environment 110 in order to select MBBR mode for a SCS flow.

The elements described above of operating environment 100 (e.g., controller 105, first AP 115, second AP 120, and STA 125) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
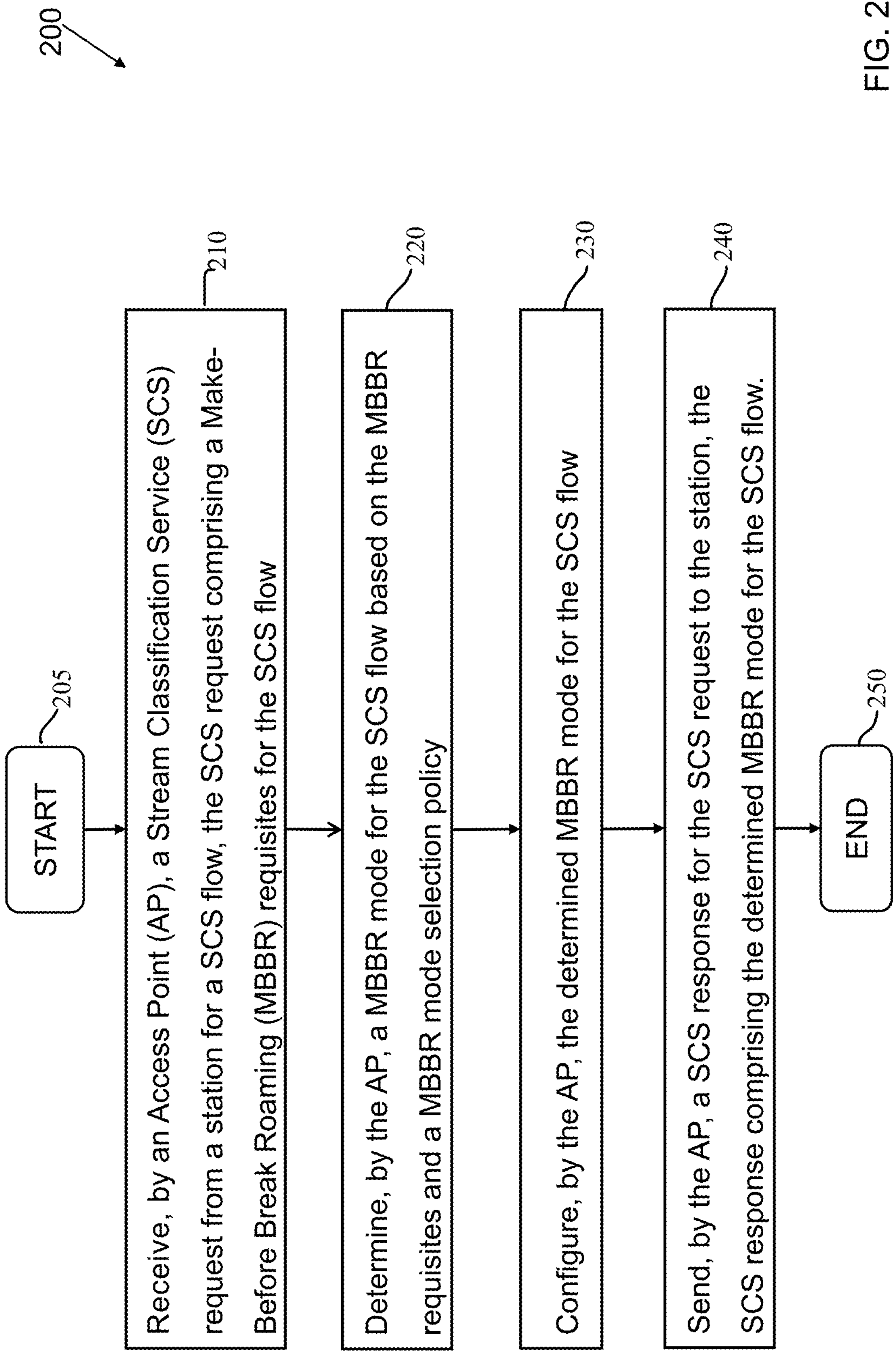
FIG. 2 is a flow chart of a method for MBBR mode selection for a SCS flow based on SCS negotiated application roaming requisites.

FIG. 2 is a flow chart setting forth the general stages involved in a method 200 consistent with implementations of the disclosure for MBBR mode selection for a SCS flow based on SCS negotiated application roaming requisites. Method 200 may be implemented using first AP 115 and STA 125 as described in more detail above with respect to FIG. 1. In some examples, method 200 may be implemented using controller 105, first AP 115, and STA 125. Ways to implement the stages of method 200 will be described in greater detail below.

The selection and configuration of the MBBR mode for a SCS flow originating from STA 125 may happen at a time of STA 125 associating with first AP 115. At the time of association, STA 125 may indicate support for various MBBR modes. The support may be indicated in a management frame sent to first AP 115 in a probe request or an association request frame. First AP 115 may select a MBBR mode for a SCS flow from the MBBR modes supported by STA 125 based on MBBR mode policy configuration of coverage environment 110.

Method 200 may begin at starting block 205 and proceed to stage 210 where first AP 115 may receive a SCS request from STA 125 for a SCS flow. The SCS request may comprise MBBR requisites for the SCS flow. The SCS flow may be associated with an application executing on STA 125. The SCS request may be received in a SCS request frame having a SCS descriptor element. The SCS descriptor element may include a flow identifier (for example, a Traffic Classifier (TCLAS) or a Traffic Identifier (TID)), a bandwidth requirement, a maximum latency, any timing constraints (for example, required minimum/maximum service interval), a maximum outage time during MBBR handoff, etc. for the SCS flow. The outage time may also be referred to as a criticality requirement during the MBBR handoff for the SCS flow.

After receiving the SCS request from STA 125 for the SCS flow at stage 210, method 200 may proceed to stage 220 where first AP 115 may determine a MBBR mode for the SCS flow based on the MBBR requisites and a MBBR mode selection policy. The MBBR mode selection policy may include a mapping of one or more MBBR requisites and a corresponding preferred MBBR mode. In some implementations, the MBBR mode selection policy may include a MBBR mode policy table. The MBBR mode policy table may include a mapping of MBBR requisites and a corresponding MBBR mode with an implied functional split. First AP 115 may match the MBBR requites for the SCS flow with each of the one or more MBBR requisites in the MBBR mode policy table to determine a closest match. In some examples, first AP 115 may determine a weighted match with each of the one or more one or more MBBR requisites in the MBBR mode policy table. A preferred MBBR mode corresponding to the closest match may be selected as the MBBR mode for the SCS flow. For example, a SCS flow with stringent latency or zero handoff outage may be mapped to a loss-less MBBR mode that may retain the state (e.g., MPDUs) at the infrastructure for tighter AP coordination to minimize disruption. In another example, a latency tolerant SCS flow may be mapped to a MBBR mode where STA 125 may maintain and recover the MAC state after handoff to reduce management over-head. First AP 115 may compare the MBBR requisites received in the SCS request with the MBBR requisites in the MBBR mode policy table to determine a match and the preferred MBBR mode for the SCS flow.

Once having determined the MBBR mode for the SCS flow at stage 220, method 200 may proceed to stage 230 where first AP 115 may configure the determined MBBR mode for the SCS flow. The MBBR mode may be configured at first AP 115 for the SCS flow. In some examples, first AP 115 may map the MBBR mode to the TID or the TCLAS of the SCS flow.

After configuring the determined MBBR mode at stage 230, method 200 may proceed to stage 240 where first AP 115 may send a SCS response for the SCS request to STA 125. The SCS response may comprise the determined MBBR mode for the SCS flow in a SCS response frame. The SCS response frame may also indicate acceptance of the requested SCS policies and TID mapping. The SCS response may further confirm to STA 125 that the determined MBBR mode has been configured to satisfy the MBBR requisites for the SCS flow or the application. The configured MBBR mode may be sent to STA 125 in the SCS response. This may indicate that STA 125 may use the determined MBBR mode for MBBR handoff for the SCS flow. Once having sent the SCS response comprising the MBBR mode to STA 125 at stage 240, method 200 may terminate at end block 250.

Subsequent MBBR operations like adding a target AP, for example, second AP 120, before removing the serving AP, for example, first AP 115, may operate based on the selected MBBR mode. The subsequent MBBR operations may be initiated by STA 125 in simpler low complexity modes or by first AP 115 in more complex coordinated modes. This may provide an optimized roaming approach tailored to the application flows. STA 125 and first AP 115 may update the MBBR mode over time by exchanging updated SCS requests and re-evaluating the MBBR mode selection policy or the MBBR mode policy table. The selected MBBR mode may dynamically be changed with change in the MBBR requisites for the SCS flow. For example, STA 125 may send a new SCS request with new MBBR requisites for the SCS flow. First AP 115 may determine a new MBBR mode based on the new MBBR requisites and the MBBR mode selection policy.

In some implementations, steps of method 200 may be performed by a logical entity coordinating the MBBR roaming. The logical entity may reside on controller 105 or may reside on first AP 115 itself. In such implementations, first AP 115 may forward the SCS request frame with the SCS descriptors to the logical entity coordinating the MBBR roaming. The logical entity may select a MBBR mode for the SCS flow based on the MBBR modes supported by STA 125, the MBBR requisites, and MBBR mode policy configuration on a network. The logical entity may inform first AP 115 of the selected MBBR mode or may configure the selected MBBR mode at first AP 115. The logical entity may also inform STA 125 of the selected MBBR mode for the SCS flow through the SCS response for the SCS request.

Figure 3:
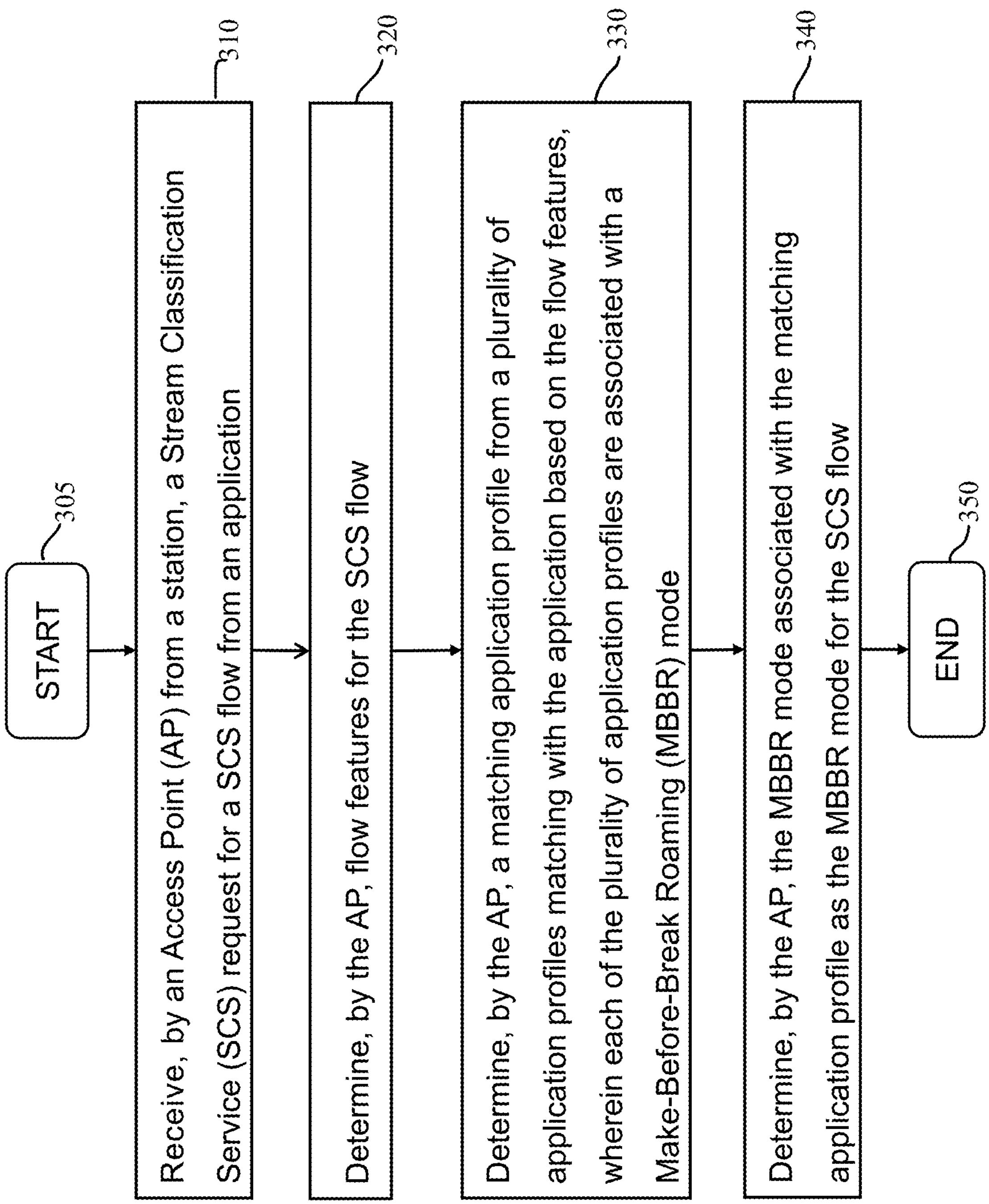
FIG. 3 is a flow chart of a method for MBBR mode selection for a SCS flow based on flow features.

In example implementations, a MBBR mode for a SCS flow may be selected based on an application profile associated with the SCS flow as determined by the wireless infrastructure. Selecting the MBBR mode based on the application profile may allow dynamically optimizing the MBBR mode per application to balance complexity while satisfying seamless roaming requisites for the application. FIG. 3 is a flow chart setting forth the general stages involved in a method 300 consistent with implementations of the disclosure MBBR mode selection for SCS flows based on flow features. Method 300 may be implemented using first AP 115 and STA 125 as described in more detail above with respect to FIG. 1. In some examples, method 300 may be implemented using controller 105 and STA 125. Ways to implement the stages of method 300 will be described in greater detail below.

Method 300 may begin at starting block 305 and proceed to stage 310 where first AP 115 may receive a SCS request from STA 125 for a SCS flow from an application. The application may execute on STA 125. The SCS request may be received in a SCS request frame having a SCS descriptor element. The SCS descriptor element may include a flow identifier (for example, a TCLAS or a TID), a required bandwidth, a maximum latency, any timing constraints, and an outage time during MBBR handoff. The outage time may also be referred to as criticality requirements during the MBBR handoff. The SCS descriptor may further include a preferred MBBR mode.

After receiving the SCS request for the SCS flow from an application at stage 310, method 300 may proceed to stage 320 where first AP 115 may determine flow features of the SCS flow. The flow features may include an application type (that is, Voice over Internet Protocol (IP) (VOIP), Audio, Video, etc.), seamlessness metric (for example, packet loss, latency, reliability, etc.), a preferred MBBR mode, etc. These flow features may be determined from the SCS request for the SCS flow or from the SCS flow itself. The flow features or profile features may be determined by deep packet inspection or pattern recognition.

Once having determined the flow features of the SCS flow at stage 320, method 300 may proceed to stage 330 where first AP 115 may determine a matching application profile from a plurality of application profiles matching with the application based on the flow features, where each of the plurality of application profiles are associated with a MBBR mode. For example, an Enterprise Policy and Control Engine (EPCE) may create and maintain a MBBR selection policy. The MBBR selection policy may include a MBBR mode policy table. The MBBR mode policy table may include a mapping of a plurality of application profiles and a corresponding MBBR mode for each application profile. Each application profile may include one or more flow features or application features (for example, latency, reliability, preferred MBBR mode, etc.) associated with that application profile. The EPCE may be located on first AP 115 or controller 105.

In example implementations, application profile entries may be automatically populated based on the traffic features received in the SCS request from STAs of coverage environment 110. In addition, the application profile entries may be crowdsourced from network administrators, solicitated from application vendors, manually updated by administrators based on application requirements, etc.

After determining the matching application profile at stage 330, method 300 may proceed to stage 340 where first AP 115 may determine the MBBR mode associated with the matching application profile as the MBBR mode for the SCS flow. First AP 115 may configure the determined MBBR mode for the SCS flow and send a SCS response to STA 125. The SCS response may confirm the acceptance of the SCS flow and determined MBBR mode for the SCS flow to STA 125. In some examples, first AP 115 may form a tunnel with the target AP (for example, second AP 120) for roaming. Once having determined the MBBR mode for the SCS flow at stage 340, method 300 may terminate at end block 350.

Figure 4:
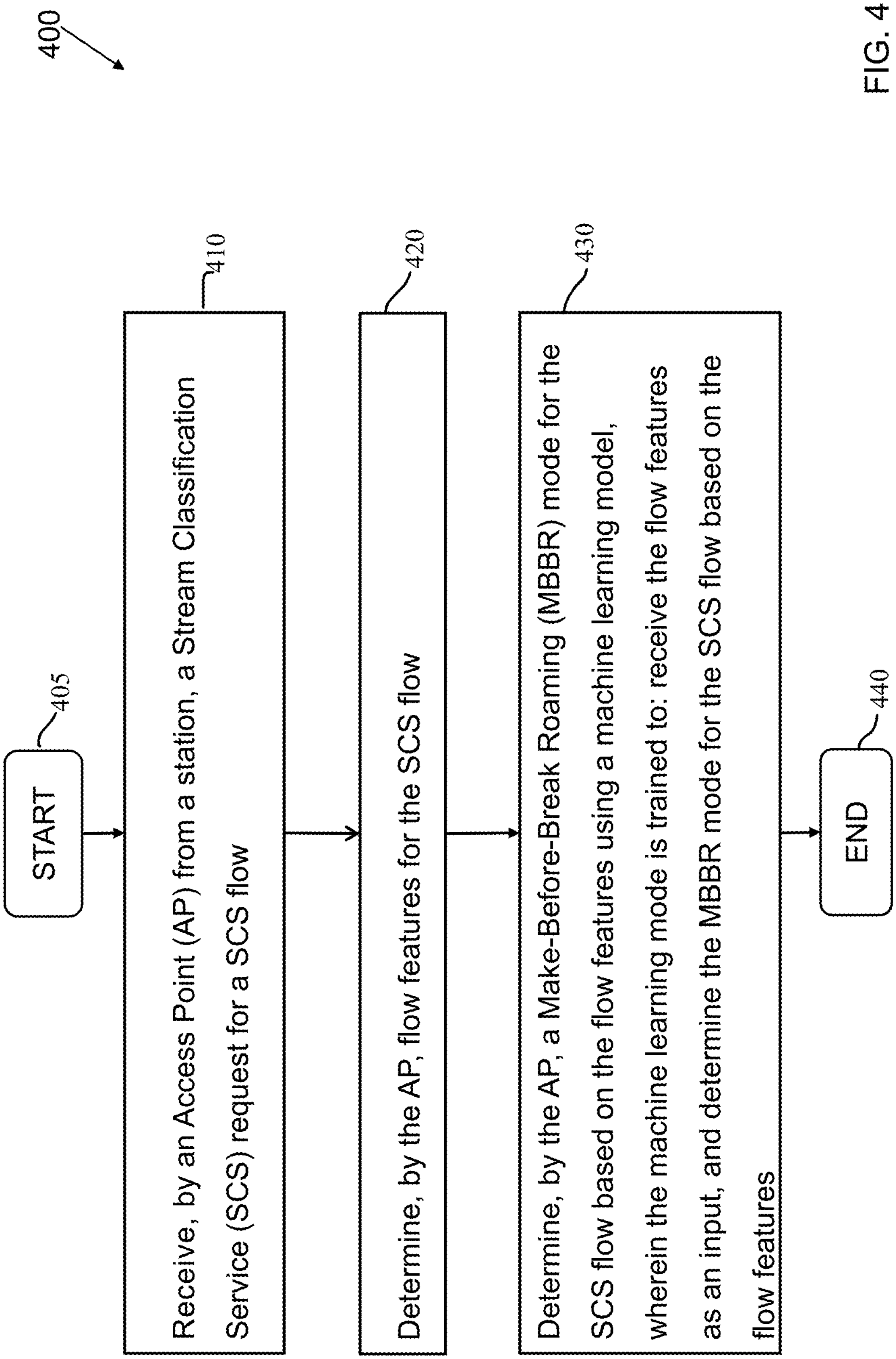
FIG. 4 is a flow chart of a method for MBBR mode selection for a SCS flow using a machine learning model.

In example implementations, a MBBR mode for an SCS flow may be selected using a machine learning model. FIG. 4 is a flow chart setting forth the general stages involved in a method 400 consistent with implementations of the disclosure MBBR mode selection based on application profiles using a machine learning model. Method 400 may be implemented using first AP 115 and STA 125 as described in more detail above with respect to FIG. 1. In some examples, method 400 may be implemented using controller 105 and STA 125. Ways to implement the stages of method 300 will be described in greater detail below.

Method 400 may begin at starting block 405 and proceed to stage 410 where first AP 115 may receive a SCS request from STA 125 for a SCS flow. The SCS flow may be associated with an application executing on STA 125. The SCS request may be received in a SCS request frame having a SCS descriptor element. The SCS descriptor element may include a flow identifier (for example, a TCLAS or a TID), a required bandwidth, a maximum latency, any timing constraints (for example, a minimum/maximum service interval), and an outage time during MBBR handoff. The outage time may also be referred to as criticality requirements during the MBBR handoff. The SCS descriptor may further include a preferred MBBR mode.

After receiving the SCS request for the SCS flow from an application at stage 410, method 400 may proceed to stage 420 where first AP 115 may determine flow features for the SCS flow. The flow features may include an application type (that is, VoIP, Audio, Video, etc.), seamlessness metric (for example, packet loss, reliability, latency, etc.), a preferred MBBR mode, etc. These flow features may be determined from the SCS request for the SCS flow or from the SCS flow itself.

Once having determined the flow features of the SCS flow at stage 420, method 400 may proceed to stage 430 where first AP 115 may determine a MBBR mode for the SCS flow based on the flow features using a machine learning model. The machine learning mode is trained to receive the traffic features as an input and determine the MBBR mode for the SCS flow based on the traffic features. The machine learning model may be trained on historical traffic features or characteristics, associated application types, and metrics on roaming performances achieved using different MBBR modes. Over time, training dataset may be updated with measured roaming performance for STAs under different MBBR modes. In addition, the machine learning model may periodically be retrained on the updated training dataset to enhance accuracy of the MBBR predictions.

First AP 115 may configure the determined MBBR mode for the SCS flow and send a SCS response to STA 125. The SCS response may confirm the acceptance of the SCS flow and determined MBBR mode for the SCS flow to STA 125. In some examples, first AP 115 may form a tunnel with the target AP (for example, second AP 120) for roaming. Once having determined the MBBR mode for the SCS flow at stage 430, method 400 may terminate at end block 440.

Figure 5:
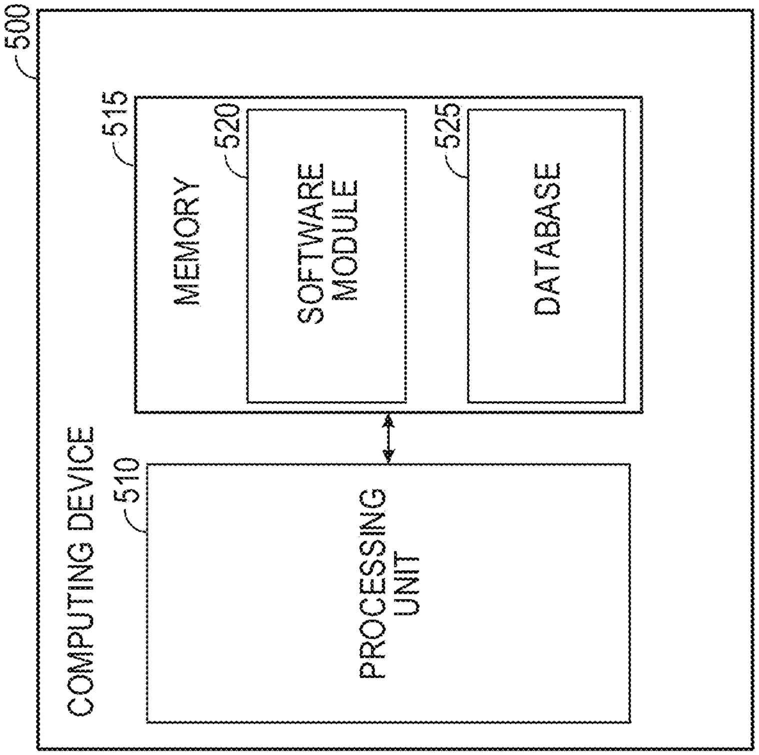
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for MBBR mode selection for a SCS flow as described above with respect to FIG. 2, FIG. 3, and FIG. 4. Computing device 500, for example, may provide an operating environment for controller 105, first AP 115, second AP 120, and STA 125. Controller 105, first AP 115, second AP 120, or STA 125 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Implementations of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, implementations of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain implementations of the disclosure have been described, other implementations may exist. Furthermore, although implementations of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, implementations of the disclosure may be practiced in an electrical circuit comprising discrete electronic elements, packaged or integrated electronic chips containing logic gates, a circuit utilizing a microprocessor, or on a single chip containing electronic elements or microprocessors. Implementations of the disclosure may also be practiced using other technologies capable of performing logical operations such as, for example, AND, OR, and NOT, including but not limited to, mechanical, optical, fluidic, and quantum technologies. In addition, implementations of the disclosure may be practiced within a general purpose computer or in any other circuits or systems.

Implementations of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to implementations of the disclosure, may be performed via application-specific logic integrated with other components of computing device 500 on the single integrated circuit (chip).

Implementations of the present disclosure, for example, are described above with reference to block diagrams and/or operational illustrations of methods, systems, and computer program products according to implementations of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for implementations of the disclosure.

What is claimed is:

1. A method comprising:

receiving, by an Access Point (AP), a Stream Classification Service (SCS) request from a station for a SCS flow, the SCS request comprising Make-Before-Break Roaming (MBBR) requisites for the SCS flow;

determining, by the AP, a MBBR mode for the SCS flow based on the MBBR requisites and a MBBR mode policy;

configuring, by the AP, the determined MBBR mode for the SCS flow; and sending, by the AP, a SCS response for the SCS request to the station, the SCS response comprising the determined MBBR mode for the SCS flow.

2. The method of claim 1, further comprising:

receiving, by the AP, a plurality of MBBR modes supported by the station; and determining, by the AP, the MBBR mode for the SCS flow from the plurality of MBBR modes.

3. The method of claim 2, wherein receiving the plurality of MBBR modes supported by the station comprises receiving the plurality of MBBR modes in a management frame sent in a probe request or in an association request.

4. The method of claim 1, wherein the MBBR requisites are included in a SCS descriptor element of a SCS request frame of the SCS request.

5. The method of claim 1, wherein the MBBR requisites comprises one or more of a maximum latency and a maximum outage time.

6. The method of claim 1, wherein the MBBR mode policy comprises a MBBR mode policy table comprising a mapping of the MBBR requites and the MBBR mode.

7. The method of claim 1, further comprising:

adding a target AP before removing a serving AP based on the determined MBBR mode.

8. The method of claim 1, further comprising:

updating the determined MBBR mode in response to receiving an updated SCS request.

9. A method comprising:

receiving, by an Access Point (AP) from a station, a Stream Classification Service (SCS) request for a SCS flow from an application;

determining, by the AP, flow features from the SCS flow;

determining, by the AP, a matching application profile from a plurality of application profiles matching with the application based on the flow features, wherein each of the plurality of application profiles are associated with a Make-Before-Break Roaming (MBBR) mode; and determining, by the AP, the MBBR mode associated with the matching application profile as the MBBR mode for the SCS flow.

10. The method of claim 9, wherein the flow features comprise one or more of an application type, a maximum latency, a maximum outage time, and a preferred MBBR mode.

11. The method of claim 9, wherein the plurality of application profiles is crowdsourced from network administrators and/or solicitated from application vendors.

12. The method of claim 9, further comprising:

configuring, by the AP, the determined MBBR mode for the SCS flow; and sending, by the AP, a SCS response for the SCS request to the station, the SCS response comprising the determined MBBR mode for the SCS flow.

13. The method of claim 9, further comprising:

receiving, by the AP, a preferred MBBR mode for the SCS flow.

14. The method of claim 9, wherein determining the matching application profile from the plurality of application profiles matching with the application based on the flow features comprises determining a weighted match for each of the plurality of application profiles.

15. The method of claim 14, further comprising:

establishing a tunnel between a target AP and a serving AP based on the determined MBBR mode.

16. A method comprising:

receiving, by an Access Point (AP) from a station, a Stream Classification Service (SCS) request for a SCS flow from an application;

determining, by the AP, flow features for the SCS flow; and determining, by the AP, a Make-Before-Break Roaming (MBBR) mode for the SCS flow based on the flow features using a machine learning model, wherein the machine learning model is trained to:

receive the flow features as an input, and determine the MBBR mode for the SCS flow based on the flow features.

17. The method of claim 16, wherein the machine learning model is trained on a training dataset comprising historical traffic features, associated application types, and metrics on roaming performance achieved using different MBBR modes.

18. The method of claim 17, further comprising:

updating the training dataset based on roaming performance for the station.

19. The method of claim 16, further comprising:

configuring, by the AP, the determined MBBR mode for the SCS flow; and sending, by the AP, a SCS response for the SCS request to the station, the SCS response comprising the determined MBBR mode for the SCS flow.

20. The method of claim 16, wherein determining the flow features for the SCS flow comprises determining the flow features for the SCS flow using deep packet inspection and pattern recognition.

* * * * *